United States Patent
Kudlu

(10) Patent No.: US 9,528,857 B2
(45) Date of Patent: Dec. 27, 2016

(54) TIME CAPTURE BASED RESOLVER TO DIGITAL CONVERTER

(71) Applicant: Infineon Technologies AG, Neubiberg (DE)

(72) Inventor: Arvind Kudlu, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 76 days.

(21) Appl. No.: 14/516,811

(22) Filed: Oct. 17, 2014

(65) Prior Publication Data

US 2016/0109266 A1    Apr. 21, 2016

(51) Int. Cl.
G01D 5/20    (2006.01)

(52) U.S. Cl.
CPC .................... *G01D 5/2073* (2013.01)

(58) Field of Classification Search
None
See application file for complete search history.

(56) References Cited

U.S. PATENT DOCUMENTS

| | | | |
|---|---|---|---|
| 4,010,463 A | 3/1977 | Kay | |
| 4,857,926 A * | 8/1989 | Neglia | G01D 5/208 318/656 |
| 4,926,105 A * | 5/1990 | Mischenko | H02P 21/06 318/800 |
| 4,989,001 A * | 1/1991 | Serev | H03M 1/645 318/661 |
| 5,920,135 A | 7/1999 | Ohshita | |
| 6,566,862 B1 * | 5/2003 | Goto | G01D 3/0365 324/207.16 |
| 7,723,940 B2 * | 5/2010 | Tinebor | G05B 23/0256 318/565 |
| 2007/0132423 A1 * | 6/2007 | Ajima | H02P 6/10 318/719 |
| 2010/0315075 A1 * | 12/2010 | Kamiya | G01B 7/30 324/207.25 |
| 2011/0109304 A1 * | 5/2011 | Suzuki | H02K 24/00 324/207.25 |

FOREIGN PATENT DOCUMENTS

WO    9641211 A1    12/1996

* cited by examiner

*Primary Examiner* — Patrick Assouad
*Assistant Examiner* — Douglas X Rodriguez
(74) *Attorney, Agent, or Firm* — Eschweiler & Associates, LLC

(57) ABSTRACT

A resolver to digital converter system comprises a resolver and a controller. The resolver has a reference winding attached to a rotor, and first and second output windings attached to a stator and coupled to the reference winding. The reference winding is configured to be driven with a reference AC signal having a known frequency and induces first and second output signals from the first and second output windings in response to the reference AC signal. The controller circuit is configured to compare the first and second output signals to first and second linear signals respectively, ascertain first and second time intervals between first and second determined start time points and first and second stop time points where magnitudes of the first and second output signals are substantially equal to magnitudes of the first and second linear signals, respectfully. The controller circuit is further configured to calculate a rotating angle of the resolver based on the first and second time intervals.

19 Claims, 5 Drawing Sheets

TIME CAPTURE BASED RESOLVER TO DIGITAL CONVERTER

FIELD

The present disclosure is in the field of resolver to digital converters, particularly, resolver to digital converters for converting an angular displacement to a digital signal by measuring time parameters.

BACKGROUND

A resolver is a kind of rotary position sensor that provides angular measurements by converting angular displacements to electrical signals. In general, a resolver comprises a rotor mechanically coupled to carry the angular displacement of interest to rotate in a stator. A reference winding is located at the rotor driven by a reference signal while two output windings are located at the stator being excited by the reference signal and generate two output signals, respectively, according to the reference signal and the angular displacement of interest.

Conventionally, a resolver-to-digital converter includes some resolver to analog conversion components followed by an analog to digital (A/D) converter. The two output signals are digitized using an A/D converter and peak values of the two output signals are acquired and processed to get the angular displacement. This approach requires a high speed, high precision A/D converter in order to retrieve peak values of the output signals.

DETAILED DESCRIPTION

Figure 1:
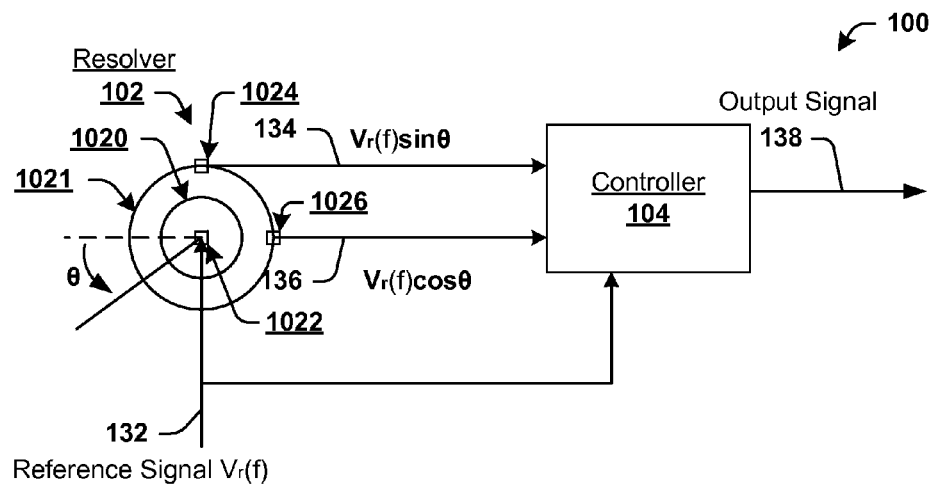
FIG. 1 is a block diagram illustrating a time capture based resolver to digital converter according to some embodiments.

The present disclosure will now be described with reference to the attached drawing figures, wherein like reference numerals are used to refer to like elements throughout, and wherein the illustrated structures and devices are not necessarily drawn to scale.

Systems and methods are disclosed that incorporate a time measurement into a resolver to digital converter. A reference AC signal is fed into a resolver having a rotary angle. First and second output signals according to the reference AC signal and the rotary angle are detected from the outputs of the resolver. By comparing the first and second output signals with first and second pre-determined reference signals, for example linear signals, respectively, first and second time intervals are acquired when the first and second output signals are equal to the pre-determined first and second reference signals respectively, from first and second determined start points. Then the first and second time intervals can be converted to the targeted rotary angle.

In some embodiments, the reference AC signal is fed into a reference winding attached to a rotor of the resolver which rotates the target rotary angle. The first and second output signals are detected from first and second output windings attached to a stator of the resolver. In some embodiments, the time interval can be detected from a determined start time point to a stop time point when the output signal is substantially equal to a linear signal. Corresponding to the first and second output signals, first and second linear signals may be a same signal or independent signals and the first and second start time points may be a same start time point or independent time points. The first and second time intervals can be respectively converted to values that are proportional to the sine and cosine of the rotary angle. By processing the first and second time intervals, the rotary angle can be acquired.

FIG. 1 is a block diagram 100 illustrating a resolver to digital converter system 100 according to some embodiments. The resolver to digital converter system 100 comprises a resolver 102 and a controller circuit 104. The resolver 102 comprises a reference winding 1022 attached to a rotor 1020, and a first output winding 1024 and a second output winding 1026 attached to a stator 1021. The rotor 1020 is configured to rotate a rotary angle θ (to be measured) from a reference position shown as a broken line. The attached reference winding 1022 is configured to be driven with a reference AC signal 132 having a known frequency f, and induces a first output signal 134 from the first output winding 1024, and a second output signal 136 from the second output winding 1026, in response to the reference AC signal 132.

In some embodiments, the first and second output signals 134 and 136 have a frequency that is equal to the frequency f of the reference AC signal 132, and the magnitude of the first output signal 134 can be proportional to a sine of the rotary angle θ, sin θ, and that of the second output signal 136 can be proportional to a cosine of the rotary angle θ, cos θ. The controller circuit 104 is configured to receive the reference signal 132, and the first and second output signals 134 and 136 to generate a digital output signal 138, i.e., the rotary angle θ, based thereon.

In some embodiments, the controller circuit 104 is configured to compare the first output signal 134 with a first linear signal and record a first time length it takes for magnitudes of the first output signal 134 and the first linear signal to become equal. Similarly, a second time length is recorded as well for the time it takes for magnitudes of the second output signal 136 and a second linear signal to become equal. The first and second time lengths, i.e., first and second time intervals are used to compute amplitudes of the first and second output signals (which are proportional to sin θ and cos θ respectively), and further compute the rotary angle θ.

Figure 2:
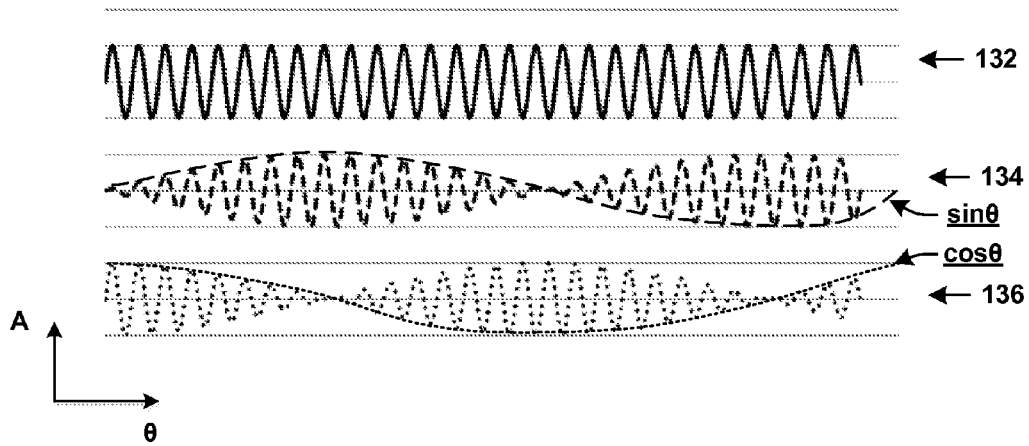
FIG. 2 is a diagram illustrating amplitude variations of a reference AC signal and output signals as a function of a rotary angle of a resolver according to some embodiments.

With reference to FIG. 1, FIG. 2 shows amplitude variations of the reference AC signal 132 and the first and second output signals 134 and 136 as a function of a rotary angle θ of a resolver 102 according to some embodiments. As shown in FIG. 2, in some embodiments, frequencies of the first and second output signals 134 and 136 are the same as the reference AC signal 132. Envelope curves of the first output signal 134 and the second output signal 136 show amplitude variations according to the rotary angle θ. The amplitude of the first output signal 134 can be proportional to sin θ and the amplitude of the second output signal 136 can be proportional to cos θ. By acquiring amplitudes, which are maximum magnitudes of the output signals, the rotary angle θ can be achieved.

Figure 3:
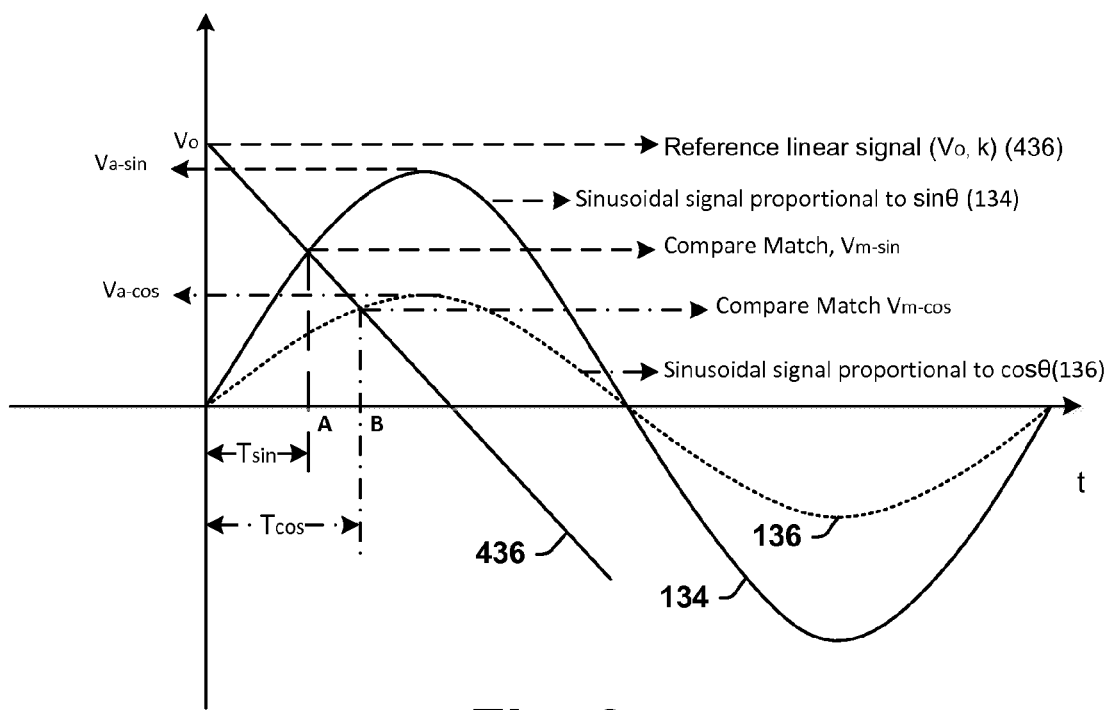
FIG. 3 is a diagram illustrating output signals with reference to a linear reference signal in the time-domain according to some embodiments.

With a certain rotary angle θ, FIG. 3 shows corresponding first and second output signals and a pre-determined linear signal in the time-domain according to some embodiments. The sinusoidal-shaped solid line can represent the first output signal 134 and the sinusoidal-shaped dotted line can represent the second output signal 136 under the certain rotary angle θ. The first and second output signals 134 and 136 have the same frequency f with the reference AC signal 132. Amplitudes of the first and second output signals 134 and 136 are proportional to sin θ and cos θ, respectively. In some embodiments, the first and second output signals 134 and 136 are in phase. As an example, determine a time point when magnitudes of the first and second output signals 134 and 136 are zero as a start time point. A reference linear signal 436 has a start magnitude $V_o$ and a slope k. In some embodiments, the start magnitude $V_o$ is larger than a maximum amplitude of the first or second output signals 134 or 136 with any rotary angles. A magnitude of the linear signal 436 can increase, decrease or be a constant value as time varies. The magnitude of the linear signal 436 is compared with a magnitude of the first output signal 134. A time point (A) is recorded as a stop time point when the magnitudes of the linear signal 436 and the first output signal 134 are equal. Then the first time interval $T_{sin}$ is acquired. In some embodiment, the magnitude of the linear signal 436 is also compared with a magnitude of the second output signal 136 and a second time interval $T_{cos}$ is acquired as a time length when the two magnitudes become equal (e.g., at time point B). In some other embodiments, a second linear signal (not shown), different from the linear signal 436, is utilized to be compared with the second output signal. The start time point of the second comparison can also be different from the first one. For example, the second comparison can be performed beginning at a next one or a few zero crossing points of the second output signal, and using a same system with the first comparison in succession.

Still referring to FIG. 3, take the first output signal 134 as an example, after the first time interval $T_{sin}$, at the stop time point A, magnitudes of the linear signal 436 and the first output signal 134 are both substantially equal to $V_{m\text{-}sin}$. $V_{m\text{-}sin}$ is related to the start magnitude $V_o$, the slope k of the linear signal 436 and the first time interval $T_{sin}$ as below:

$$V_{m\text{-}sin} = V_o - kT_{sin};$$

The amplitude of the first output signal 134, $V_{a\text{-}sin}$, can be related to the magnitude $V_{m\text{-}sin}$ at the stop time point A and the first time interval $T_{sin}$ as below:

$$V_{m\text{-}sin} = V_{a\text{-}sin} \sin(2\pi f T_{sin});$$

wherein f is the frequency of the first output signal, and in some embodiments, is also the frequency of the reference AC signal. Thus $V_{a\text{-}sin}$ can be calculated. Similarly, the amplitude of the second output signal 136, $V_{a\text{-}cos}$, can be calculated relying on relations below:

$$V_{m\text{-}cos} = V_o - kT_{cos};$$

$$V_{m\text{-}cos} = V_{a\text{-}cos} \sin(2\pi f T_{cos});$$

wherein $V_{m\text{-}cos}$ is a magnitude value that the second output signal 136 and the linear signal 436 are equal to at the second stop time point, and $T_{cos}$ is the second time interval. Then, the rotary angle θ can be calculated as below:

$$\theta = \arctan\left(\frac{V_{a\text{-}sin}}{V_{a\text{-}cos}}\right).$$

Figure 4:
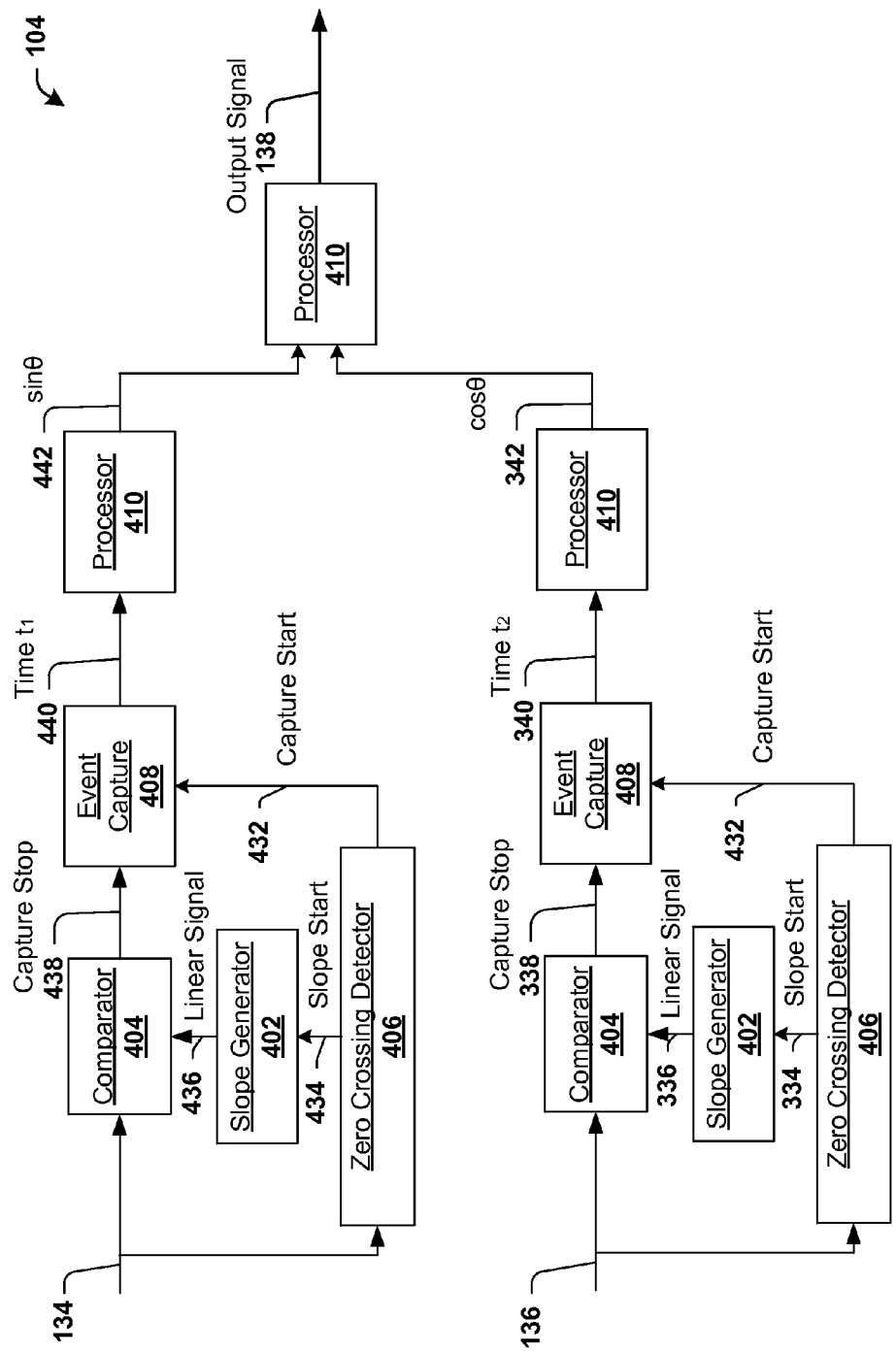
FIG. 4 is a block diagram illustrating structures of a time capture based resolver to digital converter according to some embodiments.

FIG. 4 shows a block diagram illustrating structures of a controller circuit 104 of a resolver to digital convertor according to some embodiments. Notably, for illustration purpose, two sets of components are shown in FIG. 4 having the first output signal 134 and the second output signal 136 fed in respectively. However, in some embodiments, the first and second output signals 134 and 136 are fed into a same set of components in succession, while in some other embodiments the first and second output signals 134 and 136 are processed in parallel. Take a processing system for the first output signal 134 as an example, in some embodiments, the controller circuit 104 comprises a crossing detector 406, a slope generator 402, a comparator 404, an event capture 408, and a processor 410. When received, the first output signal 134 is fed into the zero crossing detector 406 and the comparator 304. The zero crossing detector 406 can detect the first start time point at which the first output signal crosses a zero point. At the first start time point, the zero crossing detector can send a slope start signal 434 to the slope generator 402 to generate the first linear signal 436 and send a capture start signal 432 to the event capture 408 to begin timing. The first linear signal 436 is fed into the comparator 404 to compare such signal with the first output signal 134. When the magnitudes of the first linear signal 436 and the first output signal 134 are substantially equal, a capture stop signal 438 can be sent to the event capture 408 to stop timing. Thus the first time interval 440 can be acquired during which magnitude of the first output signal 134 changes from zero to a value that is equal to a magnitude of the first linear signal 436. Then the first time interval 440 can be processed by a processor 410 to get the amplitude 442 of the first output signal 134, which is proportional to sine. Repeating the process, the amplitude 342 of the second output signal 136 can be generated. Computing the amplitudes 442 and 342 of the first and second output signals 134 and 136, the output signal 138 can be generated from the processor 410 which is a digital signal of the rotary angle θ.

Figure 5:
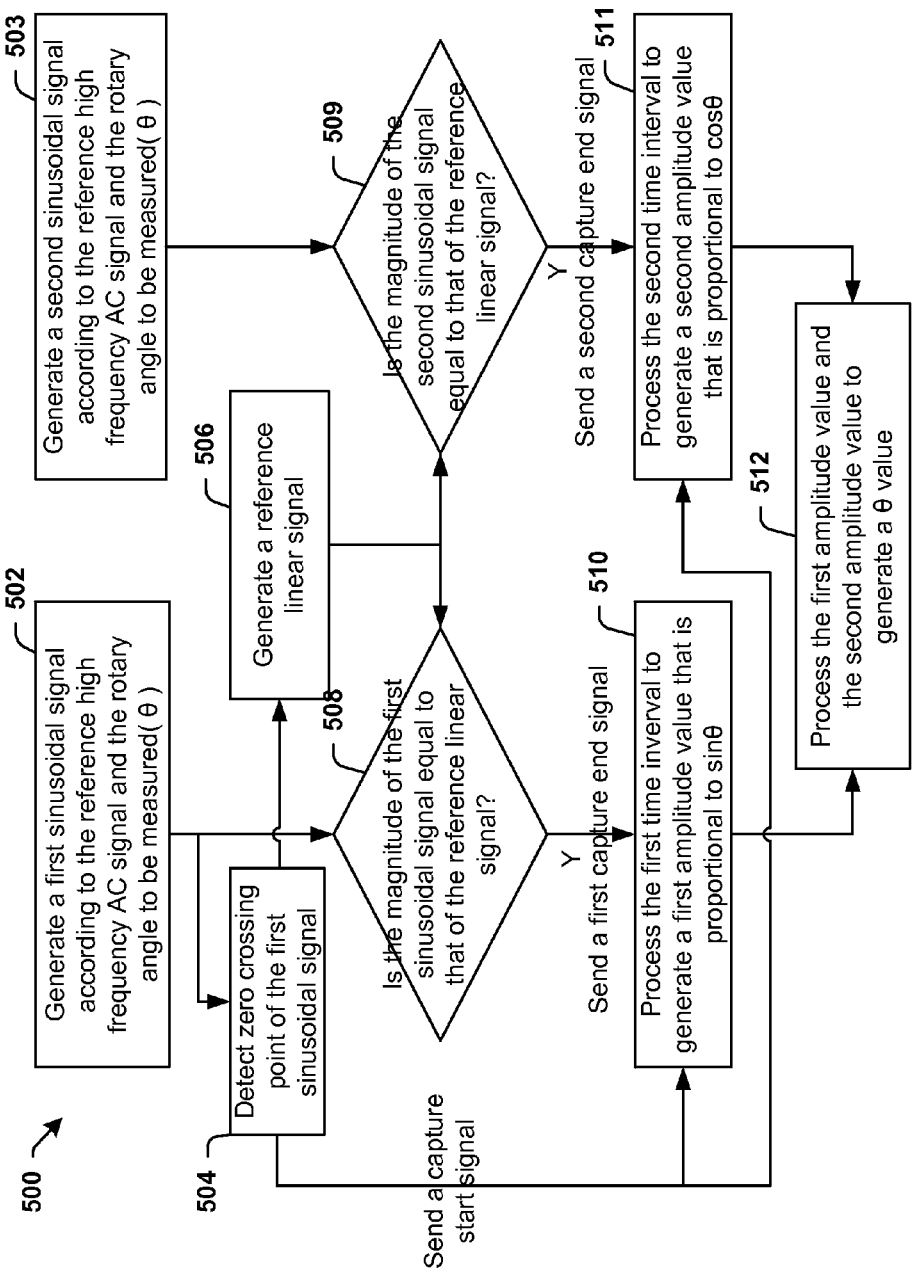
FIG. 5 is a flow diagram illustrating a method of operating a time capture based resolver to digital converter according to some embodiments.

FIG. 5 is a flow diagram illustrating a method 500 of operating a time capture based resolver to digital converter according to some embodiments. The above systems and components can be referenced to facilitate understanding of the method 500. Further, the method 500 can be at least partially incorporated by the above systems and/or components.

The method 500 generates a digital rotary angle signal of a resolver to digital convertor. First and second time intervals for first and second output signals are generated respectively first and then both employed to get the digital rotary angle signal.

The method 500 begins at blocks 502 and 503, wherein first and second sinusoidal signals are generated respectively according to the reference AC signal and the rotary angle to be measured.

At block 504, a zero crossing point of the first sinusoidal signal is detected and a capture start signal is sent to blocks 510 and 511 respectively for timing and a reference linear signal is generated at block 506 and sent to blocks 508 and 509.

At block 508, magnitudes of the first sinusoidal signal and the reference linear signal are compared. If the magnitudes are substantially equal, a first capture end signal is sent to block 510. At block 510, the first time interval is generated according to the capture start signal and the first capture end signal. Then a first amplitude value that is proportional to sine is generated and sent to block 512.

At block 509 (in the embodiment when the first and second sinusoidal signals are in phase or have a known phase difference), magnitudes of the second sinusoidal signal and the reference linear signal are compared. If the magnitudes are substantially equal, a second capture end signal is sent is sent to block 511. At block 511, the second time interval is generated according to the capture start signal and the second capture end signal. Then a second amplitude value that is proportional to cos θ is generated and sent to block 512.

At block 512, the first amplitude value and the second amplitude value are employed to generate the rotary angle value. For example, $$\theta = \arctan\left(\frac{\text{first amplitude}}{\text{second amplitude}}\right)$$

Figure 6:
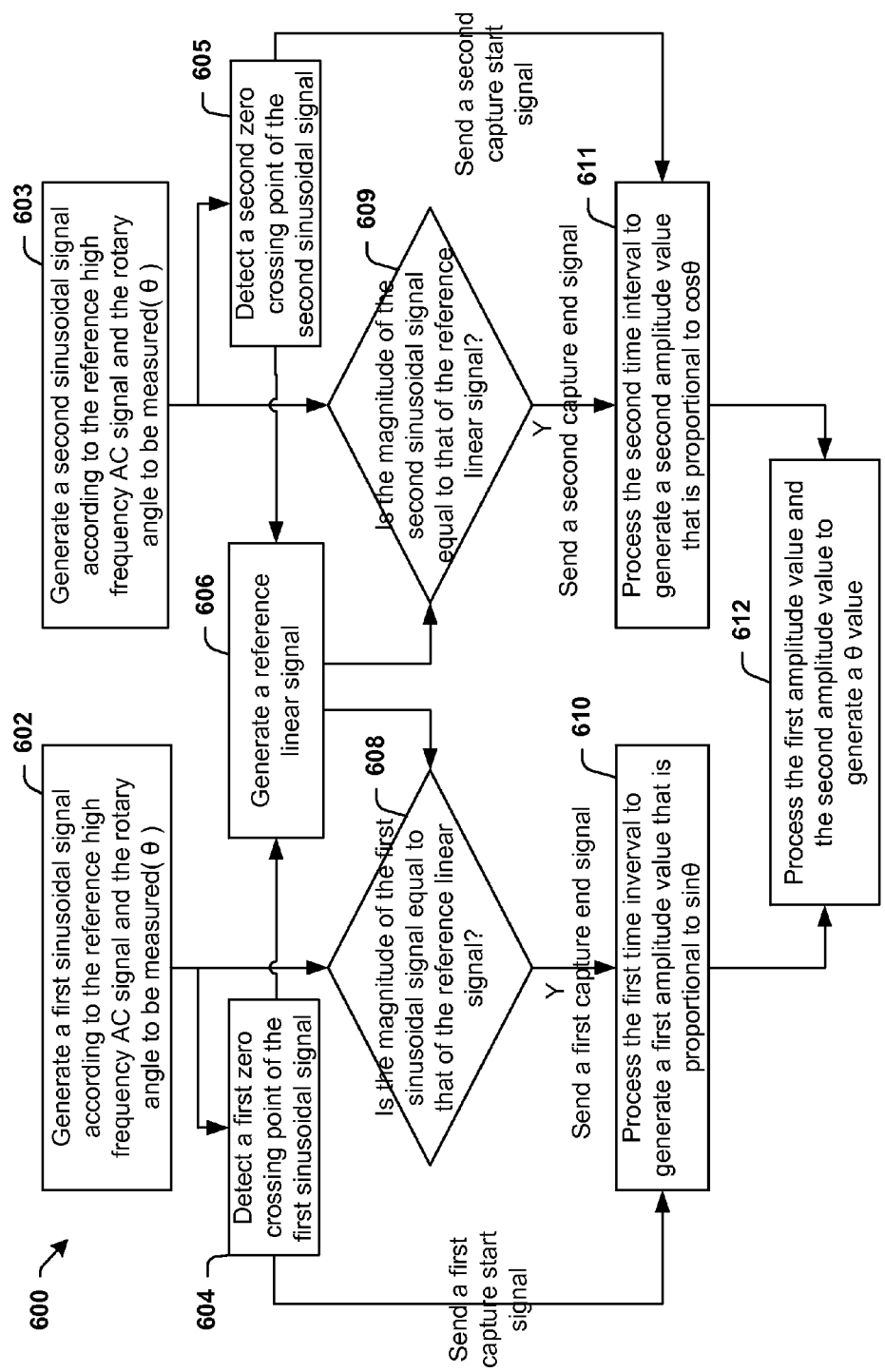
FIG. 6 is a flow diagram illustrating a method of operating a time capture based resolver to digital converter according to some other embodiments.

FIG. 6 is a flow diagram illustrating a method 600 of operating a time capture based resolver to digital converter according to some other embodiments. The above systems and components can be referenced to facilitate understanding of the method 600. Further, the method 600 can be at least partially incorporated by the above systems and/or components.

Different from the method 500 above, the method 600 does not presume the first and second output signals are in phase and detects zero crossing points separately to generate the first capture start signal and the second capture start signal respectively. Traded with more system consumption, method 600 does not require the first and second output signals be exactly in phase. Thus, a phase shift of the second output signal from the first one will not affect measurement accuracy of the second time interval.

At blocks 602 and 603, first and second sinusoidal signals are generated and sent to blocks 604, 605 and 608, 609, respectively, according to the reference AC signal and the rotary angle to be measured.

At blocks 604 and 605, a first zero crossing point of the first sinusoidal signal and a second zero crossing point of the second sinusoidal signal are respectively detected and first and second capture start signals are sent to first and second event capture (blocks 610, 611), respectively. First and second reference linear signals are generated at block 606.

At blocks 608 and 609, magnitudes of the first and second sinusoidal signals are compared to the first and second reference linear signals, respectively. A first or second capture end signal is sent to blocks 610 and 611, respectively, if the magnitudes are substantially equal.

At blocks 610 and 611, the first and second time intervals are respectively generated according to the first and second capture start signals and the first and second capture end signals. Then first and second amplitude values that are proportional to sin θ and cos θ are respectively generated and sent to block 612.

At block 612, the first and second amplitude values are computed to generate the rotary angle value.

It is appreciated that the above methods and variations thereof can be combined and utilized interchangeably. The claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of system that may be used to implement methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A resolver to digital converter system comprises a resolver and a controller. The resolver has a reference winding attached to a rotor, and first and second output windings attached to a stator and coupled to the reference winding. The reference winding is configured to be driven with a reference AC signal having a known frequency and induces first and second output signals from the first and second output windings in response to the reference AC signal. The controller circuit is configured to compare the first and second output signals to first and second linear signals respectively, ascertain first and second time intervals between first and second determined start time points and first and second stop time points where magnitudes of the first and second output signals are substantially equal to magnitudes of the first and second linear signals, respectfully. The controller circuit is further configured to calculate a rotating angle of the resolver based on the first and second time intervals.

A resolver to digital converter system comprises a reference winding attached to a rotor, excited by a reference AC signal having a known frequency and first and second output windings perpendicularly attached to a stator, coupled to the reference winding, and inducing first and second output signals having amplitudes related to a rotary angle of the rotor. The resolver to digital converter system further comprises first and second crossing detectors configured to detect first and second start time points of the first or second output signals, respectively; and first and second slope generators configured to generate first and second linear signals at the first and second start time points, respectively. The resolver to digital converter system further comprises first and second comparators configured to compare the first and second output signals with the corresponding first and second linear signals, respectively; and first and second event captures configured to record first and second time intervals from the corresponding first and second start time point to first and second stop time points wherein magnitudes of the first and second output signals are substantially equal to magnitudes of the corresponding first and second linear signals. The resolver to digital converter system further comprises a processor configured to convert the first and second time intervals to values proportional to sine and cosine of the rotary angle of the rotor, and further convert to a digital value of the rotary angle.

A rotary angle measurement method using a time capture based resolver. The method comprise applying a reference AC signal having a known frequency to a reference winding of the resolver to generate first and second output signals from first and second output windings, wherein the first and second output windings are coupled to the reference winding and detecting a moment when magnitude of the first output signal becomes zero as a start time point of an event capture. The method further comprises comparing a pre-determined reference signal with the first output signal and set as a stop time point of the event capture when magnitudes of the pre-determined reference signal and the first output signal are substantially same, wherein a time interval is generated by the start time point and stop time point of the event capture and processing the time interval to generate a sine value of the rotary angle.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A resolver to digital converter system, comprising:
a resolver comprising a reference winding attached to a rotor, and first and second output windings attached to a stator and coupled to the reference winding, wherein the reference winding is configured to be driven with a reference AC signal having a known frequency and induce first and second output signals from the first and second output windings, respectively, in response to the reference AC signal; and
a controller circuit configured to compare the first and second output signals to first and second linear signals, respectively, ascertain first and second time intervals between first and second determined start time points and first and second stop time points, respectively, where magnitudes of the first and second output signals are substantially equal to magnitudes of the first and second linear signals, respectively; wherein the controller circuit is further configured to calculate a rotating angle of the resolver based on the first and second time intervals.

2. The resolver to digital converter system of claim 1, wherein the controller circuit comprises:
a crossing detector configured to detect the first or second start time point of the first or second output signals,
a slope generator configured to generate the first or second linear signals at the first or second start time point;
a comparator configured to respectively compare the first or second output signals with the first or second linear signal,
an event capture device configured to respectively record the first or second time interval from the first or second start time point to the first or second stop time point, wherein a magnitude of the first or second output signal is substantially equal to the magnitude of the first or second linear signal, and
a processor configured to employ the first and second time intervals to generate a rotary angle of the resolver.

3. The resolver to digital converter system of claim 2, wherein the crossing detector detects a time at which the magnitude of the first or second output signals is zero as the first or second start time point, respectively.

4. The resolver to digital converter system of claim 2, wherein the crossing detector detects a time point at which the magnitude of the first output signal is zero as the first and second start time points to compare a same or different linear signal with the first and second output signals.

5. The resolver to digital converter system of claim 1, wherein the first and second windings are placed perpendicular to each other on the stator; wherein the first and second output signals are sinusoidal signals with substantially no phase delay with respect to one another, and wherein peak values of the first and second output signals are proportional to a sine and a cosine of the rotary angle, respectively.

6. The resolver to digital converter system of claim 1, wherein the first and second linear signals are a same linear signal.

7. The resolver to digital converter system of claim 1, wherein the first and second linear signals are independent linear signals.

8. The resolver to digital converter system of claim 1, wherein the second determined start time point depends on the first determined start time point.

9. The resolver to digital converter system of claim 1, wherein the second determined start time point is independent of the first determined start time point.

10. The resolver to digital converter system of claim 1, wherein the controller circuit comprises a single chip microprocessor.

11. A resolver to digital converter system, comprising:
a reference winding attached to a rotor, the reference winding configured to be excited by a reference AC signal having a known frequency;
first and second output windings perpendicularly attached to a stator, electromagnetically coupled to the reference winding, and configured to induce first and second output signals having amplitudes related to a rotary angle of the rotor; and
a controller circuit, comprising:
first and second crossing detectors configured to detect first and second start time points of the first or second output signals, respectively, first and second slope generators configured to generate first and second linear signals at first and second start time points, respectively;
first and second comparators configured to compare the first and second output signals with the corresponding first and second linear signals, respectively, first and second event capture devices configured to record first and second time intervals from the corresponding first and second start time points to the first and second stop time points, wherein magnitudes of the first and second output signals are substantially equal to magnitudes of the corresponding first and second linear signals at the stop time points, and
a processor configured to convert the first and second time intervals to values proportional to a sine and a cosine of the rotary angle of the rotor, and further convert the values proportional to the sine and the cosine of the rotary angle of the rotor to a value of the rotary angle.

12. The resolver to digital converter system of claim 11, wherein the first and second linear signals have pre-determined start values and slopes, respectively.

13. The resolver to digital converter system of claim 12, wherein the start values of the first and second linear signals are larger than a maximum amplitude of the first and second output signals.

14. The resolver to digital converter system of claim 11, wherein the first start time point is at a time point when a magnitude of the first output signal is zero.

15. The resolver to digital converter system of claim 11, wherein the first and second output signals are sinusoidal signals and peak values of the first and second output signals are proportional to sine and cosine of the rotary angle, respectively.

16. A rotary angle measurement method using a time capture based resolver, comprising:
- applying a reference AC signal having a known frequency to a reference winding of the resolver to generate first and second output signals from first and second output windings of the resolver, wherein the first and second output windings are electromagnetically coupled to the reference winding;
- detecting a time when a magnitude of the first output signal becomes zero as a start time point of an event capture;
- comparing a pre-determined reference signal with the first output signal and set another time as a stop time point of the event capture when magnitudes of the pre-determined reference signal and the first output signal are substantially same, wherein a time interval is generated by the start time point and stop time point of the event capture; and
- processing the time interval to generate a sine value of the rotary angle, wherein the pre-determined reference signal is a linear signal.

17. The method of claim 16, further comprising:
- comparing the pre-determined reference signal with the second output signal and set another time as a second stop time point of the event capture when magnitudes of the pre-determined reference signal and the second output signal are substantially same, wherein a second time interval is generated by the start time point and the second stop time point sent to the event capture;
- processing the second time interval to generate a cosine value of the rotary angle; and
- processing the sine and cosine values of the rotary angle to generate a signal corresponding the rotary angle.

18. The method of claim 16, further comprising:
- detecting a second time point when a magnitude of the second output signal becomes zero as a second start time point sending to a second event capture;
- comparing a second pre-determined reference signal with the second output signal and set as a stop time point of the second event capture when magnitudes of the second pre-determined reference signal and the second output signal are substantially same, wherein a second time interval is generated by the start time point and stop time point of the second event capture;
- processing the second time interval to generate a cosine value of the rotary angle; and
- processing the sine and cosine values of the rotary angle to generate a digital signal corresponding the rotary angle.

19. The method of claim 16, wherein a slope of the linear signal is positive, negative or zero.

* * * * *